United States Patent [19]

Grabscheid

[11] Patent Number: 5,730,692
[45] Date of Patent: Mar. 24, 1998

[54] ROLL WITH VIBRATION DAMPER

[75] Inventor: Joachim Grabscheid, Heuchlingen, Germany

[73] Assignee: Voith Sulzer Papiermaschinen GmbH, Germany

[21] Appl. No.: 650,803

[22] Filed: May 20, 1996

[30] Foreign Application Priority Data

May 20, 1995 [DE] Germany ............... 295 08 422.7

[51] Int. Cl.[6] ............................................. B23P 15/00
[52] U.S. Cl. ........................................ 492/7; 492/20
[58] Field of Search ........................ 492/2, 7, 16, 17, 492/20; 162/358.1

[56] References Cited

U.S. PATENT DOCUMENTS

| 3,512,475 | 5/1970 | Sustus et al. ............... 492/20 |
| 4,858,292 | 8/1989 | Bühlmann et al. . |
| 5,081,759 | 1/1992 | Schiel . |
| 5,487,715 | 1/1996 | Schiel . |

Primary Examiner—Irene Cuda
Attorney, Agent, or Firm—Ostrolenk, Faber, Gerb & Soffen, LLP

[57] ABSTRACT

A roll with vibration damping, particularly useful for the manufacture or treatment of fiber webs, such as paper or cardboard. The roll has a central shaft with a central feed channel for pressurized liquid and a roll shell rotatable around the stationary central shaft. A plurality of radially extending cylinders in the shaft communicate with the feed channel. A respective piston in each cylinder holds a radially outward shoe pressed in sliding engagement against the interior of the roll shell. One of several types of elastically yieldable elements is disposed in the central shaft and communicates with the feed channel for maintaining the pressure of the liquid in the feed channel upon the roll vibrating. The elastically yieldable elements include any of a spring supported piston, an elastic membrane, a closed end pipe with thin walls or a pair of separated membranes held together by a tie bar so that both membranes are pulled to apply pressure to the liquid. The elastically yieldable element may be in a separate bore defined in the central shaft at an angular location around the shaft away from the cylinder.

21 Claims, 2 Drawing Sheets

ROLL WITH VIBRATION DAMPER

BACKGROUND OF THE INVENTION

The present invention relates to a roll having a vibration damper. The roll is in particular used for the manufacture or treatment of fiber webs, for instance webs of paper or cardboard. For example, the roll may be used as one press roll in a press nip in a paper machine press section.

The present roll is an improvement over a roll having the features set forth below which are known from EP 0 330 657, FIG. 6.

The known roll has a stationary central shaft and an annular roll shell which rotates around the central shaft. Within the central shaft there are a number of cylindrical boreholes or chambers which extend in a radial direction. Each chamber contains a radially displaceable piston with a radial exterior that presses on the interior of the roll shell. Each cylinder chamber beneath a piston can be filled with a pressurized liquid, which transmits a hydraulic supporting force from the central shaft to the pistons and via the pistons to the shell of the roll.

For feeding the pressurized liquid into the cylinder chambers, there is a feed channel within the stationary central shaft. That channel is, for instance, arranged centrally through the shaft and it is connected via a respective constricted conduit (for instance, a throttle hole) to each of the cylinder chambers.

For damping possible vibration of the roll shell of the known roll, at least one length of hose is provided in the central feed channel. The ends of the hose are closed and it is filled with a gas. This provides a compressible bubble of gas in the central feed line, which establishes an equilibrium between the pressure of the pressurized liquid and the pressure of the gas contained in the length of hose. In other words, the central feed channel can be only partially filled with liquid, and that volume of the feed channel which can be filled with liquid can change.

This known roll device operates in the following manner. If the roll shell should, for any reason, exert a swinging movement in a radial direction with respect to the central shaft inside the shell, thus produces periodic changes in the volume of the cylinder chambers and also in the pressure of the liquid present in the cylinder chambers. Therefore, a liquid exchange takes place via the throttle holes between the cylinder chambers and the central feed channel. If the throttle holes are properly dimensioned, and as a result of the fact that the above mentioned bubble of gas is present in the immediate vicinity of the throttle holes, noticeable damping of the vibrations of the roll shell is obtained.

The above mentioned patent, therefore, aims in the correct direction since insufficiently active vibration dampers in such rolls repeatedly lead to difficulties in, for instance, paper manufacturing machines. This can reduce the quality of the paper webs produced, or the vibrations may lead to premature wear of the roll or of other adjacent parts of the machine.

Therefore, although the known roll with vibration damper already substantially satisfies the demands made on it, there are doubts as to the permanent effectiveness of the length of hose in the central channel.

SUMMARY OF THE INVENTION

The object of the present invention, therefore, is to further improve a known roll having vibration dampers such that the volume of the central feed channel can be varied during continuous operation in the simplest possible but nevertheless reliable manner. In this connection, devices for changing the volume of the feed channel should still be arranged at the smallest possible distance from the constricted conduits (which are for instance, throttle holes) which lead to the cylinder chambers.

This object is achieved by providing at least one second borehole that intersects the central feed channel of the central shaft, and preferably an array of such boreholes along the shaft. The second boreholes are at different circumferential positions around the shaft from the first boreholes or chambers that provide hydraulic support to the pistons, and the first and second boreholes are preferably perpendicular to each other at the central feed channel.

An elastically yieldable element is supported in each second borehole. It is deformable under the pressure of the liquid and applies pressure constantly on the liquid in the respective second borehole for keeping the liquid in the central channel of the shaft under pressure and for absorbing vibration. In other words, equilibrium can be established in operation between the pressure of the pressurized liquid and the opposing force which results from the deformation of the yieldable element.

The invention can be applied both for hydrodynamically lubricated slide surfaces between the piston (or slide shoes) and the shell of the roll (in accordance with EP 0 330 657, FIG. 6) as well as for hydrostatic bearing pockets at the roll shell (in accordance with Federal Republic of Germany 38 02 234). It can also be employed for only a single piston (with slide shoe) which extends over the length of the roll (U.S. Pat. No. 3,276,102).

Other objects, features and advantages of the present invention will become apparent from the following description of embodiments of the invention which refer to the accompanying drawings.

DETAILED DESCRIPTION OF PREFERRED EMBODIMENTS

Figure 1:
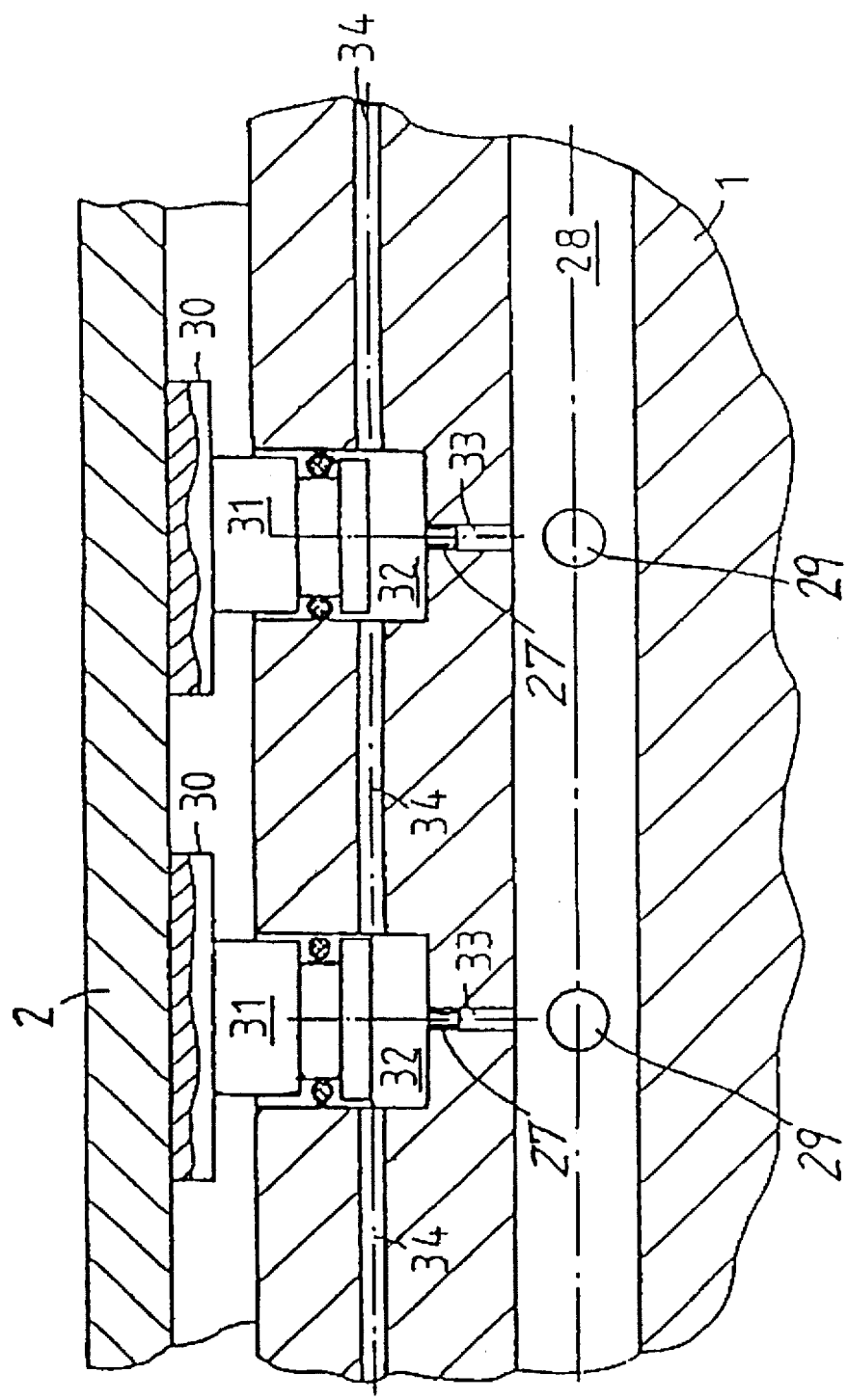
FIG. 1 is a partial longitudinal section through a roll with a vibration damper according to the invention.

The roll shown in FIG. 1 has a stationary central shaft 1 and an annular roll shell 2 which rotates around the central shaft. The roll shell is supported in known manner on both of its ends on, for instance, the stationary central shaft 1. The shaft is so shaped and sized that there is an annular space between the shaft and the interior surface of the roll shell and that space may be connected to the environment.

A feed channel 28 for pressurized liquid like a hydraulic fluid extends in the longitudinal direction through the radial center of the central shaft. The pressurized liquid passes from the channel 20 via several radial boreholes 33 into several cylinder chambers 32 arranged spaced apart in a row along one plane along the length of the roll. There is a piston 31 in each cylinder chamber which is displaceable in the radial direction and includes a seal around it which prevents liquid passing by the piston. For instance, the piston has a slide shoe 30 on its radially outer end. The shoe has a convexly curved slide surface which is adapted to the internal shape of the roll shell 2. Upon the presence of elevated pressure in the cylinder chambers 32, the slide shoes 30 are pressed by the respective pistons 31 against the inner surface of the roll shell 2. In this way, the roll shell 2 is pressed against a mating parallel roll (not shown). Controllable sagging of the roll shell occurs due to the pressure applied by the mating or counter roll. For example, the roll sag is maintained at a value of zero by establishing a given pressure within the cylinder chambers.

The invention is provided for damping possible radial vibrations of the roll shell 2.

Each of the radial boreholes 33 includes a constricted line section, for instance in the form of a throttle 27. This slows rapid changes in the pressure behind the pistons.

Furthermore, the central shaft 1 has several boreholes 29 transverse to the holes 33 which would connect the feed channel 28 to the annular space present between the roll shell 2 and the central shaft 1. Normal atmospheric pressure customarily prevails in this annular space since the annular space is connected at its axial ends to the environment via lines not shown in the drawing.

In the event of possible vibrations of the roll shell, the volume of the central feed channel 28, which is filled with pressurized liquid, can change rapidly, without being impeded. Various embodiments permitting rapid changes are now described.

Figure 2:
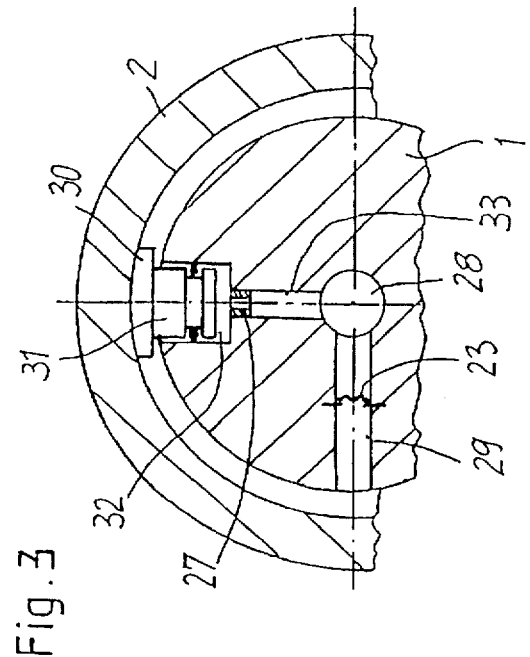
FIGS. 2 to 5 shows different embodiments of the vibration damper, in each case in a reduced partial cross section along the line A—A of FIG. 1.

In the embodiment shown in FIG. 2, the volume of the feed channel 28 is limited by a respective piston 22 arranged in and sealing each transverse borehole 29. This piston is supported in position against the liquid pressure in channel 28 and hole 29 by a compression spring 21 so that a rapid change in the volume of the channel 28 is compensated by corresponding rapid movements of the pistons 22 which maintains the liquid under pressure.

Figure 3:
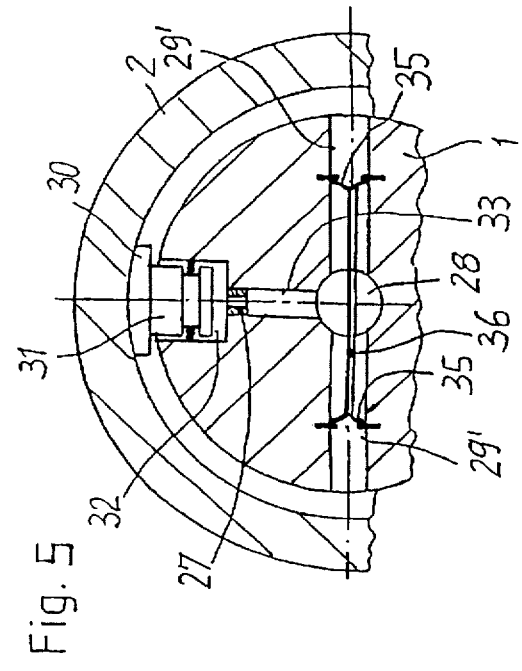

In the embodiment shown in FIG. 3, a resilient membrane 23 is instead installed in the transverse borehole and seals the hole. The resilience of the membrane applies pressure on the liquid.

Figure 4:
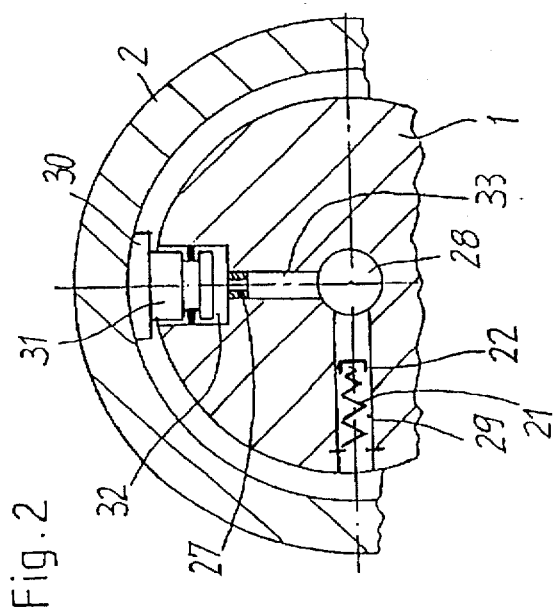

In the embodiment shown in FIG. 4, a thin walled length of pipe 34 of high strength extends through the transverse borehole 29. The radially outer end of the length of pipe is closed off while its inner end is open toward the feed channel 28. The thin walls can absorb vibration and rapid volume change in channel 28.

Figure 5:
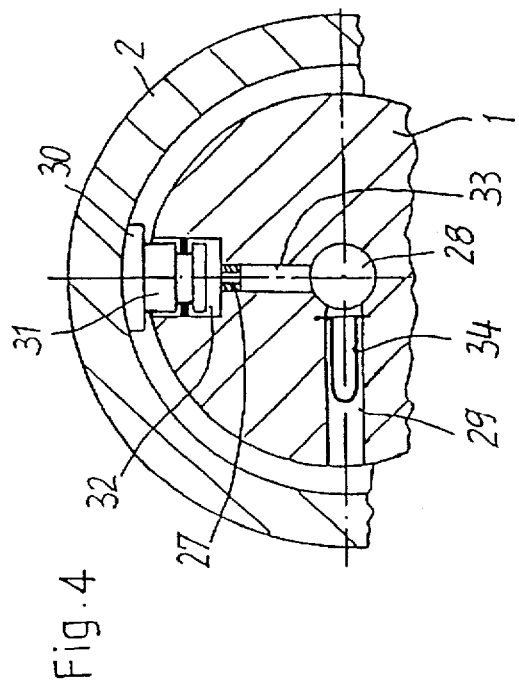

In the embodiment shown in FIG. 5, a membrane 35 is provided in a continuous transverse borehole 29' that extends from both sides of the feed channel 28. The two membranes are connected by a high strength tiebar 36 which is elongatable in the longitudinal direction. The tiebar draws the membranes together to compensate the pressure changes on them. Other designs of elastically yieldable elements placed in the boreholes 29 for maintaining the pressure on the liquid can be used.

The embodiments which are shown in FIGS. 2 to 5 and which serve for vibration damping are provided in multiple number in the central shaft 1, and are preferably distributed uniformly over the length of the central shaft. Preferably, a respective transverse borehole 29 is provided in the immediate vicinity of each radial borehole 33. Each of the transverse boreholes is provided with a device for damping vibrations. However, the boreholes 29 need not be each provided for one borehole 33, they need not be in the immediate longitudinal vicinity of one another, more than one set of boreholes 29, 33 may serve a single piston, there may be several pistons serving one shoe like shoe 30, and other designs for the boreholes 29, 33 and the pistons maybe envisioned. Even pressure chambers without pistons in them, as in hydrostatic bearings supporting shoes against the inside of the roll shell, may be used with the vibration damping invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A roll with vibration damping for use in manufacture, the roll comprising:

a non-rotating central shaft, a feed channel through the shaft for containing a pressurized liquid; a rotatable, annular roll shell around the shaft and supported for rotation around the central shaft, the roll shell having an interior;

at least one cylinder in the shaft, extending toward the roll shell and communicating with the feed channel; a line in the shaft communicating pressurized liquid between the feed channel and the cylinder;

roll shell support means in the cylinder and extending into sliding communication with the interior of the roll shell and supporting the roll shell, and the pressurized liquid in the feed channel transmitting a hydraulic supporting force from the central shaft to the roll shell via the line in the shaft and the roll shell support means;

an elastically yieldable element in the shaft placed for applying pressure on the liquid in the feed channel and to the roll shell support means, the elastically yieldable element being deformable under the pressure of the pressurized liquid and being adapted to resist such deformation for maintaining pressure on the liquid in the feed channel.

2. A roll with vibration damping for use in manufacture, the roll comprising:

a non-rotating central shaft, a feed channel through the shaft for containing a pressurized liquid; a rotatable, annular roll shell around and supported for rotation around the central shaft, the roll shell having an interior;

at least one cylinder in the shaft and extending toward the roll shell; a line communicating between the feed channel and the cylinder;

a respective radially displaceable piston in each of the cylinders which is displaceable by pressure in the cylinder behind the piston; each of the pistons including a radially outwardly facing side resting against the interior of the roll shell;

a connection between the feed channel and each of the cylinders on the side of each piston toward the feed channel, for communicating liquid under pressure in the feed channel to act on the pistons;

an elastically yieldable element in the shaft placed for applying pressure on the liquid in the feed channel and to the connections to the cylinders, the elastically yieldable element being deformable under the pressure of the pressurized liquid and being adapted to resist such deformation for maintaining pressure on the liquid in the feed channel and in the connections to the cylinders.

3. The roll of claim 2, further comprising a further bore in the central shaft communicating with the feed channel; the elastically yieldable element being disposed in the further bore for there being exposed to the pressurized liquid in the feed channel and being elastically yieldably supported for applying continuous pressure to the pressurized liquid in the feed channel.

4. The roll of claim 2, wherein the connection between the feed channel and the cylinder comprises a constricted line for throttling the flow of pressurized liquid therethrough to the piston in the cylinder.

5. The roll of claim 2, wherein the elastically yieldable element comprises a piston which communicates with the feed channel and comprises a spring which acts on the piston to urge the piston against the pressure of the liquid in the feed channel.

6. The roll shell of claim 5, further comprising a further bore in the central shaft communicating with the feed channel; the elastically yieldable element piston being disposed in the further bore for there being exposed to the pressurized liquid in the feed channel and the piston being elastically yieldably supported by the spring for applying continuous pressure to the pressurized liquid in the feed channel.

7. The roll of claim 2, wherein the elastically yieldable element comprises a yieldable membrane supported in the central shaft for applying pressure to the liquid elastically.

8. The roll of claim 7, further comprising a further bore in the central shaft communicating with the feed channel; the elastically yieldable element membrane being disposed in the further bore for there being exposed to the pressurized liquid in the feed channel and the membrane being elastically yieldably supported for itself applying continuous pressure to the pressurized liquid in the feed channel.

9. The roll of claim 2, wherein the elastically yieldable element comprises a thin walled length of pipe having one end closed liquid tight and having an opposite end which opens toward the feed channel, whereby the liquid in the feed channel is in the closed end pipe.

10. The roll of claim 9, further comprising a further bore in the central shaft communicating with the feed channel; the elastically yieldable element pipe being disposed in the further bore for there being exposed to the pressurized liquid in the feed channel and the pipe being elastically yieldable for applying continuous pressure to the pressurized liquid in the feed channel.

11. The roll of claim 2, further comprising a further bore in the central shaft intersecting the feed channel and extending away from the feed channel in two directions and up to the exterior of the central shaft beneath the roll shell; the additional yieldable element being disposed in the further bore.

12. The roll of claim 11, wherein the shaft and the roll shell are shaped to define a space between the central shaft and the interior of the roll shell, and the space is connected to atmospheric pressure; the further bore communicating with the space.

13. The roll of claim 3, further comprising a further bore in the central shaft, intersecting the feed channel and extending away from the feed channel in two directions for defining two portions of the further bore;

a respective membrane in each of the portions of the further bore; a tie bar extending between the membranes and being elongatable elastically in the longitudinal direction for drawing the membranes toward each other.

14. The roll of claim 13, wherein the two portions of the additional bore are on opposite sides of the feed channel.

15. The roll of claim 14, wherein the additional bore comprise a continuous transverse borehole through the central shaft and intersecting the feed channel.

16. The roll of claim 2, wherein there are a plurality of the cylinders disposed along the shaft and a respective one of the elastically yieldable elements at each of the cylinders.

17. The roll of claim 3, wherein there are a plurality of further bores in the shaft and a respective yieldable element in each further bore.

18. The roll of claim 17, wherein there are a plurality of the cylinders disposed along the shaft.

19. The roll of claim 17, wherein the further bores are at a different angular position around the shaft from the cylinders.

20. The roll of claim 19, wherein the cylinders are in a common plane along the shaft.

21. The roll of claim 20, wherein the further bores are perpendicular to the cylinders at the feed channel.

* * * * *